(12) United States Patent
Xu et al.

(10) Patent No.: US 11,491,955 B2
(45) Date of Patent: Nov. 8, 2022

(54) WINDSCREEN WIPER AND A MOTOR VEHICLE COMPRISING SUCH WINDSCREEN WIPER

(71) Applicant: Changshu Valeo Automotive Wiper Systems Co., Ltd., Jiangsu (CN)

(72) Inventors: Jing Xu, Shanghai (CN); Raphael Meneguz, Shanghai (CN); Yang Zhao, Shanghai (CN)

(73) Assignee: Changshu Valeo Automotive Wiper Systems Co., Ltd., Jiangsu (CN)

( * ) Notice: Subject to any disclaimer, the term of this patent is extended or adjusted under 35 U.S.C. 154(b) by 138 days.

(21) Appl. No.: 16/962,150

(22) PCT Filed: Jan. 31, 2018

(86) PCT No.: PCT/CN2018/074704
§ 371 (c)(1),
(2) Date: Jul. 14, 2020

(87) PCT Pub. No.: WO2019/148360
PCT Pub. Date: Aug. 8, 2019

(65) Prior Publication Data
US 2020/0353897 A1    Nov. 12, 2020

(51) Int. Cl.
*B60S 1/22* (2006.01)
*B60S 1/16* (2006.01)
(Continued)

(52) U.S. Cl.
CPC ............. *B60S 1/22* (2013.01); *B60S 1/163* (2013.01); *B60S 1/482* (2013.01); *H01H 63/04* (2013.01); *H01H 63/10* (2013.01)

(58) Field of Classification Search
CPC .. B60S 1/22; B60S 1/163; B60S 1/482; B60S 1/08; B60S 1/48; B60S 1/18; B60S 1/522;
(Continued)

(56) References Cited

U.S. PATENT DOCUMENTS 5,998,949 A    12/1999 Amagasa
6,737,593 B1    5/2004 Porter et al.
(Continued)

FOREIGN PATENT DOCUMENTS

CN    201863804 U    6/2011
CN    107107871 A    8/2017
(Continued)

OTHER PUBLICATIONS

State Intellectual Property Office of the P.R. China, PCT International Search Report and Written Opinion for International Application No. PCT/CN2018/074704, dated Nov. 6, 2018.
(Continued)

*Primary Examiner* — Katina N. Henson
(74) *Attorney, Agent, or Firm* — Changshu Valeo Automotive Wiper Systems Co., Ltd.

(57) ABSTRACT

The present invention relates to a motor vehicle's windscreen wiper, that includes a wiper blade and driving system; where the driving system includes a wiper motor, a wheel plate that pivots about a central rotational axis; where the wheel plate's angular position is associated with the wiper blade's angular position; where a parking cam on the wheel is associated with two parking contact springs with parking electrodes that press against the wheel plate surface under a resilient bias of the parking contact spring; where a parking trace is defined by a track slid by the parking electrode on the wheel plate during the wheel plate's rotation such that distances between the contact spring parking electrodes and
(Continued)

the wheel plate's central rotation axis is substantially equal to each other such that traces of the parking electrodes generally coincide with each other; where the invention further includes a single-trace parking cam consisting of only one arc-segment such that the parking trace substantially follows a center arc by; where application of the single-trace cam is able to achieve the wiper parking function of the windscreen wiper in a compact and cost-effective manner.

11 Claims, 3 Drawing Sheets

(51) Int. Cl.
  *B60S 1/48* (2006.01)
  *H01H 63/04* (2006.01)
  *H01H 63/10* (2006.01)

(58) Field of Classification Search
  CPC .......... B60S 1/52; H01H 63/04; H01H 63/10; H01H 19/58; H01H 19/02; H01H 67/06; H01R 39/00; H01R 4/64; H02K 5/22; H02K 7/116
  USPC ........................................................ 15/97.3
  See application file for complete search history.

(56) References Cited

U.S. PATENT DOCUMENTS

| 2015/0113754 A1* | 4/2015 | Umeno | B60S 1/482 15/250.04 |
| 2015/0175128 A1* | 6/2015 | Chun | H02K 11/21 318/443 |
| 2017/0253217 A1 | 9/2017 | Porter et al. | |
| 2017/0259787 A1 | 9/2017 | Stefani et al. | |

FOREIGN PATENT DOCUMENTS

| CN | 107161105 A | 9/2017 | |
| DE | 102014203269 A1 * | 8/2015 | ................ B60S 1/08 |
| EP | 0521528 A1 | 1/1993 | |
| FR | 2830672 A1 | 4/2003 | |
| JP | S62 176068 A | 8/1987 | |
| JP | 2008236995 A | 10/2008 | |

OTHER PUBLICATIONS

European Patent Office, Extended European Search Report for corresponding European Application No. 18903893.8, dated Jan. 12, 2022.

* cited by examiner

WINDSCREEN WIPER AND A MOTOR VEHICLE COMPRISING SUCH WINDSCREEN WIPER

CROSS-REFERENCE TO RELATED APPLICATIONS

This application is filed under 35 U.S.C. § 371 U.S. National Phase of International Application No. PCT/CN2018/074704 filed Jan. 31, 2018 (published as WO2019148360), the disclosure of which is herein incorporated by reference in its entirety.

TECHNICAL FIELD

The present invention relates to a windscreen wiper for a motor vehicle, comprising a wiper blade and a driving system. The driving system comprises a wiper motor for driving the wiper blade to rotate, and performs the windscreen wiper parking function, in particular, by a single-trace cam. The driving system for the windscreen wiper can also incorporate additional features such as wiper pump control function. The invention also relates to a motor vehicle comprising such a windscreen wiper.

BACKGROUND

Motor vehicles are often equipped with windscreen wipers for wiping the windscreen to ensure the driver a good view to his/her surroundings, particularly under harsh weather conditions. The driving unit of such a windscreen wiper is usually provided with a parking controller which is suitable for identifying a specific position (for example the original position of a wiper blade, also referred to as the parking position) of an element which moves back and forth periodically within a certain angular range, so that the driver can turn the wiper off at any point during the wiping process and the wiper blade always returns to its parking position.

It is known to those skilled in the art that a wiper parking controller of electrical contact type can be incorporated into a wiper motor. For example, the electrical contact parking controller includes a wheel plate made of insulating material having a metal cam disposed on the wheel plate, rotating together with the wheel plate. An electrode supported by a metal spring plate is pressed against the surface of the wheel plate, and the electrode is fixed. With the rotation of the wheel plate, the electrode slides a track on the wheel plate, calling a trace. A portion of the trace passes through the cam such that the cam can come into or out of contact with the electrode. Normally, it is needed to provide two electrodes. When both electrodes are in contact with the cam, the two electrodes form an electrical connection in-between. In contrast, when both electrodes are in contact with the wheel plate or only one electrode is in contact with the cam, the electrical connection between the two electrodes switches off. The switching on and off of this electrical connection provides a determination of whether the wiper blade is in its parking position.

In the case of known electrical contact parking controller consisting of wheel plate, cams and electrodes, as shown in FIG. 1A, the cam has two arc-segments with different radii, thus being called a dual-trace cam. The radially inner arc-segment of the dual-trace cam extends a greater angle, and the radially outer arc-segment of the dual-trace cam extends at a smaller angle and is angularly centered on the radially inner arc-segment. The two electrodes are in contact with the wheel plate surface at different radial positions, i.e. the two electrodes each have a different trace. The radially inner arc-segment and the radially outer arc-segment of the dual-trace cam respectively correspond to a trace.

A disadvantage of this conventionally designed dual-trace cam is the radial size being too large. In particular, as shown in FIG. 1B, when it is required to integrate other functions dependent on the angle in a similar manner on the wheel plate, extra cams need to be provided on the wheel plate, making it necessary to increase the size of the wheel plate, otherwise there will not be enough space for the cam to be placed.

In addition, it is also known in the art that there is a non-electrical wiper parking controller. For example, U.S. Pat. No. 6,737,593 B1 discloses a wiper parking controller comprising a permanent magnet and a magnetic sensor such as a Hall sensor, wherein the permanent magnet is mounted on the wheel plate and rotates together with the wheel plate, and the magnetic sensor can detect magnetic field of the magnet, thus realizing the angular position measurement. However, this wiper parking controller requires providing a magnet and a magnetic sensor in the wiper driving unit, thus increasing the cost.

As a result, the existing windscreen wipers suffer from a number of drawbacks that make the windscreen wipers unable to achieve the wiper parking function in a compact and cost-effective manner.

SUMMARY OF THE INVENTION

Accordingly, it is an object of the present invention to provide a windscreen wiper for a motor vehicle. The windscreen wiper comprises a driving system, which performs the windscreen wiper parking function in particular by means of a single-trace cam and is therefore more compact. The driving system of the windscreen wiper can also incorporate additional features such as wiper cleaning fluid spray control.

This object is achieved by a windscreen wiper for a motor vehicle according to one embodiment of the invention. The windscreen wiper includes a wiper blade and a driving system including a motor for driving the wiper blade to rotate. The driving system further comprises a wheel plate, a parking cam arranged on the wheel plate and two parking contact springs each carrying a parking electrode. The wheel plate rotates around its central rotation axis under the driving of the motor, and an angular position of the wheel plate is associate with an angular position of the wiper blade. The wheel plate is made of an insulting material such as plastic, and the parking cam is made of a conductive material such as metal. The surface of the parking cam is generally coplanar with the surface of the wheel plate, and the parking electrode is pressed against the surface of the wheel plate under the resilient bias of the parking contact spring. The parking contact springs are arranged such that the distance between the parking electrodes and the rotation axis of the wheel plate is approximately equal, so as to make the parking traces slid by the parking electrodes on the wheel plate substantially coincide with each other. Thus, the parking cam may be a single-trace cam consisting of only one arc-segment and the parking trace of the parking electrodes passes substantially along the center arc of the parking cam. Due to this arrangement, the radial dimension of the parking cam can be minimized, which in turn can reduce the radius of the gear and reduce the overall dimension of the driving system of the windscreen wiper of the motor vehicle.

In one embodiment of the present invention, the angular position of the parking cam on the wheel plate corresponds to the parking position of the wiper blade, i.e. when both parking electrodes are in contact with the parking cam and an electrical connection is established between the two parking electrodes, the wiper motor stops running. Optionally, the angular position of the parking cam on the wheel plate may correspond to the operating position of the wiper blade, i.e. neither of the parking electrodes comes into contact with the parking cam or only one of the parking electrodes contacts with the parking cam, thus switch off the electrical connection between the two parking electrodes, the wiper motor stops running.

In a preferred embodiment of the present invention, the driving system of the windscreen wiper can also integrate the wiper cleaning fluid control function. For this, the windscreen wiper further comprises a cleaning fluid pump to spray cleaning fluid to a windscreen of the motor vehicle, and the driving system comprises a pump control cam mounted on a wheel plate and two pump control contact springs each carrying a pump control electrode. The two pump control contact springs are also arranged such that the distance between the two pump control electrodes and the rotation axis of the wheel plate is approximately equal, i.e. the pump control traces slid by the pump control electrode on the wheel plate substantially coincide with each other. Thus, the pump control cam is also a single-trace cam consisting of only one arc-segment and the pump control traces generally follow the center arc of the pump control cam. When both pump control electrodes are in contact with the pump control cam and establish an electrical connection between the pump control contact springs, the windscreen wiper cleaning fluid pump is started and the cleaning fluid is sprayed. In contrast, the cleaning fluid pump stops operating when neither of the pump control electrodes is in contact with the pump control cam or only one is in contact with the pump control cam so that the electrical connection between the two pump control contact springs breaks.

Since both the pump control cam and the parking cam are single-trace cams that are radially minimized, the wheel plate can have enough space to mount the pump control cam and the parking cam. The driving system of the windscreen wiper can integrate both the parking function and the cleaning fluid spray control function, without increasing its overall size.

By integrating the cleaning fluid spray control function into the driving system of the windscreen wiper, the spray of cleaning fluid can be associated with the angular position of the wiper blade. The relative angular position between the pump control cam and the parking cam may be configured such that the cleaning fluid is sprayed while the wiper blade is within a predefined angular range. For example, it is particularly advantageous to spray the cleaning fluid during the wiper blade moves from the parking position to its A-pillar position, i.e. the maximum open-angle position of the wiper blade near the A-pillar of the motor vehicle.

In an alternative embodiment of the invention, the wheel plate is provided with grooves into which the parking cam and/or the pump control cam are embedded. In addition, the wheel plate is provided with one or more snap structures on the inner and/or outer edge of the grooves. After installing the parking cam and/or the pump control cam, the snap structure presses down against the parking cam and/or the pump control cam to prevent it from detachment. Optionally, the parking cam and/or the pump control cam are provided on their bottom part with one or more barbed pins. During installation, the pin punctures the wheel plate and fastens the parking cam and/or pump control cam onto the wheel plate.

The invention also relates to a motor vehicle comprising a windscreen wiper as described above.

BRIEF DESCRIPTION OF THE DRAWINGS

Hereinafter, the present invention will be described in more detail by way of example and with reference to the accompanying drawings, in which.

The same or similar components are denoted by the same reference numeral throughout the drawings.

DETAILED DESCRIPTION

To make the objects, technical solutions, and advantages of the embodiments of the utility model more obvious to those skilled in the art, the technical solution of the present utility model will be explained clearly and completely below in conjunction with the accompanied drawings of embodiments.

Unless specified otherwise, scientific or technical terms used herein have the ordinary meaning understood by those skilled in the art. The use of "a", "an" or "the" and similar words in this utility model patent application specification and claims do not represents a limitation to quantity, but rather represents the presence of at least one. "Comprise" or "comprising" and similar terms means the element or object appears in front of the term contains elements or objects listed appear after the term, but not exclude other elements or objects.

Figure 1A:
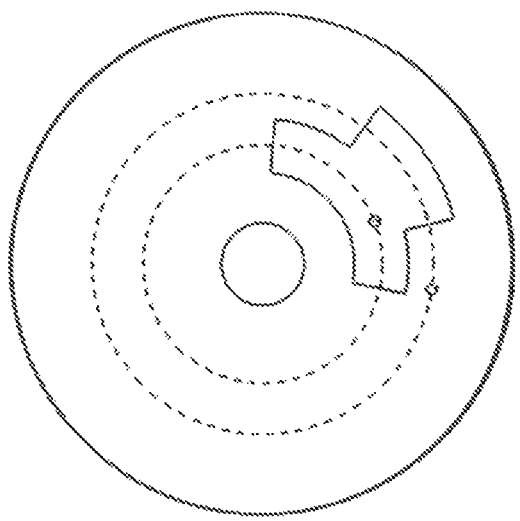
FIGS. 1A and 1B show a schematic view of a wheel plate and a cam of a parking controller of a windscreen wiper according to the prior art.
Figure 1B:
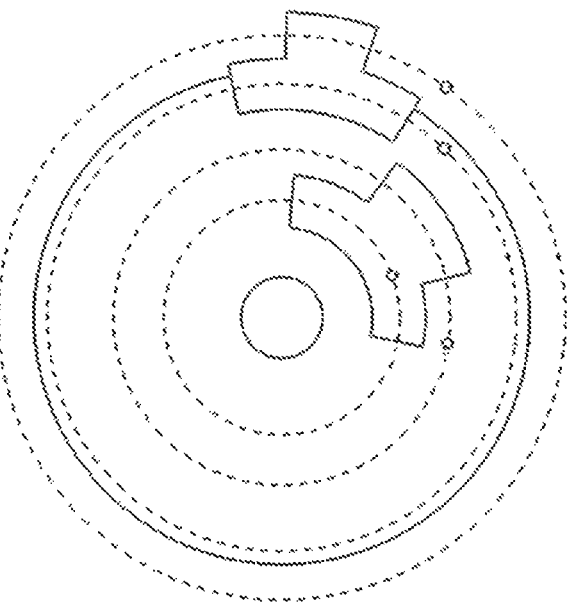

FIG. 1A shows a schematic view of a wheel plate and a cam for performing parking function in the driving unit of a windscreen wiper according to the prior art. The cam is a dual-trace cam having two arc-segments of different radii. The traces slid by the two electrodes for the wiper control on the wheel plate respectively pass through the radially inner arc-segment and the radially outer arc-segment. As can be seen, the dual-trace cam is too large in its radial dimension thus occupies most of the radial space on the wheel plate. As shown in FIG. 1B, when it is desired to integrate other functions in the driving unit that requires a similar cam, there is no enough space on the wheel plate to place a cam without increasing its diameter.

Figure 2A:
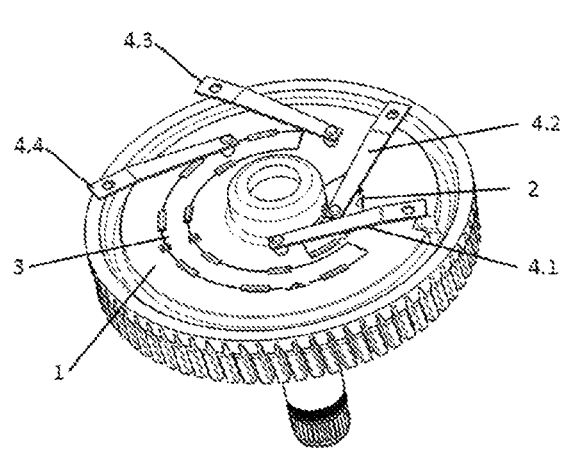
FIGS. 2A and 2B show an assembly view and an exploded view of the driving system of the windscreen wiper, respectively, according to one embodiment of the present invention.
Figure 2B:
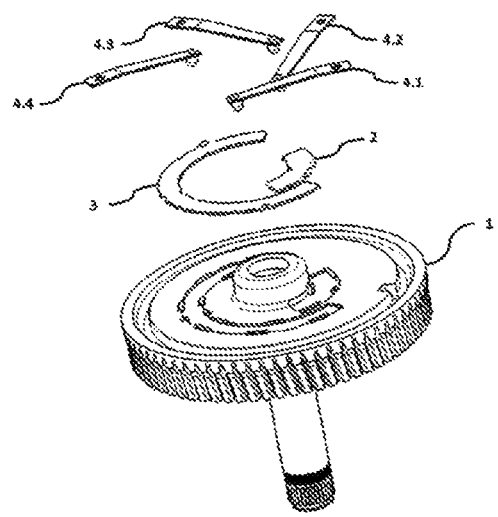

FIGS. 2A and 2B respectively show an assembled view and an exploded view of the driving system of the windscreen wiper according to one embodiment of the present invention. For the sake of clarity, several components of a windscreen wiper motor that are not relevant to the understanding of the technical solution of the invention have been omitted. In this embodiment, the driving system comprises a wheel plate 1, a parking cam 2 and a pump control cam 3 arranged on the wheel plate 1, as well as two park contact springs 4.1-4.2 each carrying a parking electrodes, and two pump control contact springs 4.3-4.4 each carrying a pump control electrodes. The wheel plate 1 is made of plastic material or any other suitable insulting materials, and both the parking cam 2 and the pump control cam 3 are made of a conductive metal material.

Both the parking cam 2 and the pump control cam 3 are single-trace cams consisting of only one arc-segment. In the embodiment shown in FIGS. 2A and 2B, the pump control cam 3 has a larger radius and is arranged radially outward of the parking cam 2. It is easily understood by a person skilled in the art that embodiments in which the parking cam 2 has a larger radius are also possible. The two parking electrodes carried by the parking springs 4.1 and 4.2 are approximately equal in distance to the central axis of the wheel plate 1 so as to slide generally coincident traces on the wheel plate. The trace of the parking electrode roughly follows the center arc of the parking cam 2. Similarly, the distance between the two pump control electrodes carried by the pump control contact springs 4.3 and 4.4 and the central axis of the wheel plate 1 is also approximately equal. The trace of the pump control electrode generally follows the center arc of the pump control cam 3.

Grooves are arranged on the surface of the wheel plate 1, and pluralities of snap structures are arranged on the inner edge and the outer edge of the groove. After the parking cam 2 and the pump control cam 3 are embedded in the groove, the snap structures are pressed downward to prevent the parking cam and the pump control cam from detachment. Although not shown in the drawings, the parking cam 2 and the pump control cam 3 may be fastened to the wheel plate 1 by other means. For example, the parking cam 2 and/or the pump control cam 3 may be provided with one or more barbed pins on its bottom part and fastened to the wheel plate 1 by piercing the pin into the wheel plate.

Figure 3:
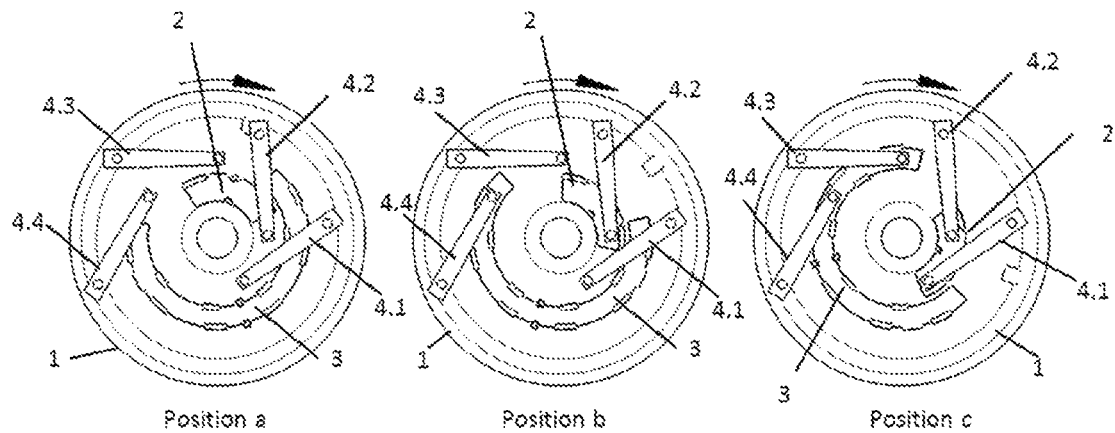
FIG. 3 shows a schematic view of the parking function of the windscreen wiper according to the embodiment shown in FIGS. 2A and 2B.

FIG. 3 shows a schematic illustration of the parking function of the driving system of the windscreen wiper according to the embodiment shown in FIGS. 2A and 2B. As shown in the figure, at the position a, the parking contact spring 4.1 is not in contact with the parking cam 2, and the parking contact spring 4.2 is also not in contact with the parking cam 2. Therefore, the parking contact spring 4.1 and the parking contact spring 4.2 are in an open circuit state, and the wiper motor keeps operating. This corresponds to the state where the windscreen wiper is not in its parking position when the user closes the windscreen wiper during the wiping. At the position b, the wheel plate 1 rotates clockwise to a position that the parking cam 2 comes into contact with the parking contact spring 4.2 but still does not come into contact with the parking contact spring 4.1. Therefore, the parking contact spring 4.1 and the parking contact spring 4.2 are still in an open circuit state, and the wiper motor keeps running. At the position c, the wheel plate 1 is rotated to an angle at which both the parking contact spring 4.2 and the parking contact spring 4.1 are in contact with the parking cam 2. At this point, the windscreen wiper returns to its parking position. An electrical connection is formed between the parking contact spring 4.1 and the parking contact spring 4.2, and the wiper motor stops operating.

Figure 4:
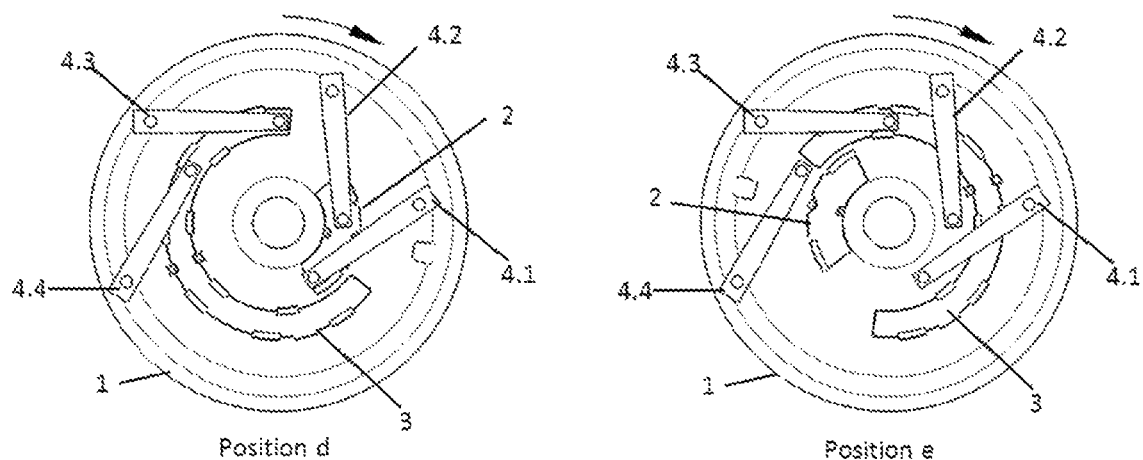
FIG. 4 shows a schematic view of the cleaning fluid spray control function of the windscreen wiper according to the embodiment shown in FIGS. 2A and 2B.

FIG. 4 shows a schematic illustration of the cleaning fluid spray control function of the driving system of the windscreen wiper according to the embodiment shown in FIGS. 2A and 2B. As shown in the figure, at the position d, both the parking contact spring 4.2 and the parking contact spring 4.1 are in contact with the parking cam 2, which means that the wiper blade is in its parking position. Both the pump control contact spring 4.3 and the pump control contact spring 4.4 are also in contact with the pump control cam 3, thus forming an electrical connection therebetween. The cleaning fluid pump starts to function and the cleaning fluid is sprayed to the windscreen of the motor vehicle. During the clockwise rotation of the wheel plate 1 from position d to position e, the wiper blade rotates from its parking position to its A-pillar position (i.e., the position of the wiper blade closest to the A-pillar of the motor vehicle) While applying the cleaning fluid to the windscreen of the motor vehicle. At the position e, the parking contact spring 4.2 and the parking contact spring 4.1 are located radially opposite the parking cam 2, which means that the wiper blade reaches its A-pillar position. Although the pump control contact spring 4.3 is still in contact with the pump control cam 3, the pump control contact spring 4.4 has been disengaged from the pump control cam 3. As a result, the electrical connection between them is broken, the cleaning fluid pump stops operating, and the windscreen wiper stops spraying the cleaning fluid to the windscreen of the motor vehicle.

It should be noted that the angular position of the parking contact springs 4.1-4.2 and the parking cam 2 as well as the pump control contact springs 4.3-4.4 and the pump control cam 3 is particularly arranged such that the cleaning fluid is only sprayed while the wiper blade is within a predefined angular range. In particular, in the embodiment of FIG. 4, the windscreen wiper only sprays the clean fluid during the wiper blade swinging from the parking position to the A-pillar position, the cleaning fluid is sprayed onto the windscreen of the motor vehicle. Specifically, in the position d, the parking contact spring 4.1 is just in contact with the parking cam 2 and the pump control contact spring 4.3 is also just in contact with the pump control cam 3. That is, when the wiper blade reaches its parking position, the windscreen wiper begins spraying the cleaning fluid to the windscreen of the motor vehicle. Similarly, in position e, the parking cam 2 is rotated by approximately 180° relative to the position d, and the parking contact spring 4.1 is just out of contact with the pump control cam 3. That is, when the wiper blade reaches its A-pillar position, the windscreen wiper stops spraying the cleaning fluid until the wheel plate 1 rotates back to position d. This avoids the cleaning fluid directly flow downward due to gravity without being applied to the windscreen by the wiper blade.

Figure 5:
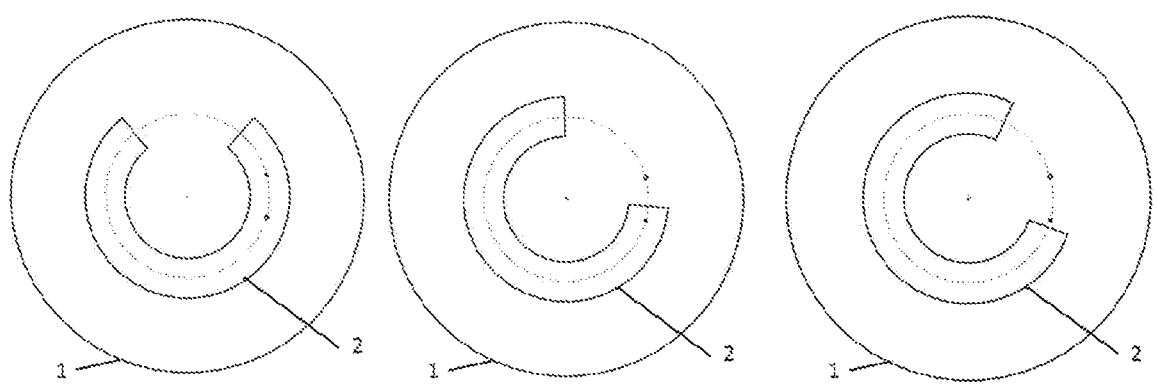
FIG. 5 shows a schematic view of a wheel plate and a cam of the driving system of the windscreen wiper according to another embodiment of the present invention.

In the above embodiment of the present invention, the angular position of the parking cam 2 on the wheel plate 1 corresponds to the parking position of the wiper blade. When the user turns off the windscreen wiper and both parking electrodes are in contact with the parking cam 2, and an electrical connection is established between the two parking electrodes, the wiper motor stops to function. FIG. 5 shows a schematic view of a wheel plate and a parking cam of the driving system of the windscreen wiper according to another embodiment of the present invention. As shown in FIG. 5, the angular position of the parking cam 2 on the wheel plate 1 corresponds to the operating position of the wiper blade. That is, when the user turns off the windscreen wiper and neither of the parking electrodes is in contact with the parking cam 2 or only one of the parking electrodes comes in contact with the parking cam 2, the electrical connection between the two parking electrodes switches off and the wiper motor stops operating.

In addition, in the embodiment shown in FIG. 4, the angular position of the pump control cam 3 on the wheel plate 1 corresponds to the operating position of the cleaning fluid pump of the windscreen wiper, that is, when the user turns on the cleaning fluid spraying and both of the two pump control electrodes are in contact with the pump control cam 3, an electrical connection establishes between the two pump control electrodes, the cleaning fluid pump operates and sprays the cleaning fluid. Although not shown in the drawings, it should be understood that the angular position of the pump control cam 3 may also correspond to the position at which the cleaning fluid pump stops operating. When the user turns on the cleaning fluid spraying and neither of the pump control electrodes is in contact with the pump control cam 3 or only one of the pump control electrodes is in contact with the pump control cam 3, the electrical connection between the two pump control electrodes switches off, and the cleaning fluid pump will then start to function and the cleaning fluid is sprayed.

The structure, advantages and features of the present invention have been described above with reference to specific embodiments in conjunction with the accompanying drawings. It should be understood by those skilled in the art that the foregoing description is by way of example only and is not intended to be limiting. It will be apparent to those skilled in the art that various modifications and substitutions may be made therein without departing from the spirit and scope of the invention.

What is claimed is:

1. A windscreen wiper of a motor vehicle comprising:
a wiper blade and a driving system with a wiper motor for driving the wiper blade, where the windscreen wiper further includes a cleaning fluid pump to spray cleaning fluid to a windscreen of the motor vehicle;
the driving system further includes:
a wheel plate driven by the wiper motor to pivot about a central axis of rotation of the wheel plate, an angular position of the wheel plate that is associated with an angular position of the wiper blade;
a pump control cam disposed on the wheel plate;
two pump control contact springs, each said contact spring carrying a pump control electrode pressing against the surface of the wheel plate under a resilient bias of each respective pump control contact spring;
a track slid by each pump control electrode on the wheel plate during rotation of the wheel plate called a pump control trace,
where a distance between each pump control electrode of said pump control contact springs and the central rotation axis of the wheel plate is substantially equal to one another such that each pump control trace of each pump control electrode generally coincides with one another;
the pump control cam being a single-trace cam consisting of only one arc-segment, the pump control trace substantially following a center arc of the pump control cam;
a parking cam disposed on the wheel plate;
two parking contact springs, each said spring carrying a parking electrode pressing against a surface of the wheel plate under a resilient bias of the parking contact spring, a track slid by the parking electrode on the wheel plate during the rotation of the wheel plate called a parking trace,
where a distance between the parking electrodes of the two parking contact springs and the central axis of rotation of the wheel plate is substantially equal to each other, so that parking traces of the parking electrodes generally coincide with each other, and
the parking cam is a single-trace cam consisting of only one arc-segment, the parking trace substantially following a center arc of the parking cam;
wherein a relative angular position between the pump control cam and the parking cam is configured so that the cleaning fluid is only sprayed when the wiper blade is within a predefined angular range.

2. The windscreen wiper according to claim 1, wherein an angular position of the parking cam on the wheel plate corresponds to a parking position of the wiper blade, at a condition when a user turns off the windscreen wiper and both of the parking electrodes are in contact with the parking cam, such that the wiper motor is configured to stop operating.

3. The windscreen wiper according to claim 1, wherein an angular position of the parking cam on the wheel plate corresponds to an operating position of the wiper blade, at a condition when a user turns off the windscreen wiper and neither of the two parking electrodes is in contact with the parking cam or only one parking electrode is contact with the parking cam, such that the wiper motor is configured to stop operating.

4. The windscreen wiper according to claim 1, wherein an angular position of the pump control cam on the wheel plate corresponds to an operating position of the cleaning fluid pump of the windscreen wiper, that is, when a user turns on the cleaning fluid spraying and both pump control electrodes are in contact with the pump control cam, the cleaning fluid pump of the windscreen wiper will operate and sprays the cleaning fluid.

5. A windscreen wiper according to claim 1, characterized wherein an angular position of the pump control cam on the wheel plate corresponds to a closed position of the cleaning fluid pump of the windscreen wiper when a user turns on the cleaning fluid spraying and neither pump control electrode is in contact with the pump control cam or
only one pump control electrode is in contact with the pump control cam, the cleaning fluid pump of the windscreen wiper configured to operates and sprays the cleaning fluid.

6. A windscreen wiper blade according to claim 1, wherein the wheel plate is provided with grooves into which the parking cam or the pump control cam are embedded, and one or more snap structures are provided on the inner or outer edges of the grooves, the snap structures configured to press down against the parking cam or the pump control cam to prevent component detachment.

7. A windscreen wiper according to claim 1, wherein the parking cam or the pump control cam are provided at respective bottom portions with one or more barbed pins, which are configured to pierces the wheel plate to fasten the parking cam or the pump control cam to the wheel plate upon installation.

8. A motor vehicle comprising a windscreen wiper according to claim 1.

9. A windscreen wiper of a motor vehicle comprising a wiper blade and a driving system with a motor for driving the wiper blade, where the driving system further comprises:
a wheel plate driven by the wiper motor to pivot about a central axis of rotation of the wheel plate, an angular position of the wheel plate that is associated with an angular position of the wiper blade;
a pump control cam disposed on the wheel plate;
a parking cam disposed on the wheel plate;
two parking contact springs, each said spring carrying a parking electrode pressing against a surface of the wheel plate under a resilient bias of the parking contact spring, a track slid by the parking electrode on the wheel plate during the rotation of the wheel plate called a parking trace;

where a distance between the parking electrodes of the two parking contact springs and the central axis of rotation of the wheel plate is substantially equal to each other, so that parking traces of the parking electrodes generally coincide with each other;

the parking cam is a single-trace cam consisting of only one arc-segment, the parking trace substantially following a center arc of the parking cam; and wherein a relative angular position between the pump control cam and the parking cam is configured so that the cleaning fluid is only sprayed when the wiper blade is configured to swing from the parking position to an A-pillar position.

10. A windscreen wiper of a motor vehicle comprising:

a wiper blade and a driving system with a motor for driving the wiper blade;

the driving system further includes:

a wheel plate driven by the motor to pivot about a central axis of rotation of the wheel plate, an angular position of the wheel plate that is associated with an angular position of the wiper blade;

a pump control cam disposed on the wheel plate;

a parking cam arranged on the wheel plate;

two parking contact springs, each with a parking electrode pressing against a surface of the wheel plate under a resilient bias of a respective parking contact spring;

a parking trace formed by a track slid by the parking electrode on the wheel plate during rotation, where a distance between each parking electrode of the two parking contact springs and the central axis of rotation of the wheel plate is substantially equal to one another, so that respective parking traces of associated parking electrodes generally coincide with each other, and the parking cam performs as a single-trace cam consisting of only one arc-segment;

where the parking trace substantially follows a center arc of the parking cam; and wherein an angular position of the parking cam on the wheel plate corresponds to a parking position of the wiper blade, at a condition when a user deactivates the windscreen wiper and both parking electrodes are in contact with the parking cam, such that the wiper motor will be configured to stop operating.

11. A windscreen wiper of a motor vehicle comprising:

a wiper blade and a driving system with a motor for driving the wiper blade;

the driving system further includes:

a wheel plate driven by the motor to pivot about a central axis of rotation of the wheel plate, an angular position of the wheel plate that is associated with an angular position of the wiper blade;

a pump control cam disposed on the wheel plate;

a parking cam arranged on the wheel plate;

two parking contact springs, each with a parking electrode pressing against a surface of the wheel plate under a resilient bias of a respective parking contact spring;

a parking trace formed by a track slid by the parking electrode on the wheel plate during rotation, where a distance between each parking electrode of the two parking contact springs and the central axis of rotation of the wheel plate is substantially equal to one another, so that respective parking traces of associated parking electrodes generally coincide with each other;

the parking cam performs as a single-trace cam consisting of only one arc-segment, where the parking trace substantially follows a center arc of the parking cam; and wherein the relative angular position between the pump control cam and the parking cam is configured so that the cleaning fluid is only sprayed when the wiper blade is within a predefined angular range.

* * * * *